(12) United States Patent
Saleh et al.

(10) Patent No.: US 9,226,210 B1
(45) Date of Patent: Dec. 29, 2015

(54) USE OF FALLBACK CARRIER LOAD TO MANAGE FALLBACK COMMUNICATION SETUP LATENCY

(71) Applicant: Sprint Spectrum L.P., Overland Park, KS (US)

(72) Inventors: Ahmad N. Saleh, Overland Park, KS (US); Siddharth S. Oroskar, Overland Park, KS (US); Jose L. Hernandez, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 253 days.

(21) Appl. No.: 13/947,568

(22) Filed: Jul. 22, 2013

(51) Int. Cl.
*H04W 36/22* (2009.01)

(52) U.S. Cl.
CPC ..................................... *H04W 36/22* (2013.01)

(58) Field of Classification Search
None
See application file for complete search history.

(56) References Cited

U.S. PATENT DOCUMENTS

| | | | |
|---|---|---|---|
| 4,916,728 A | 4/1990 | Blair | |
| 5,950,130 A | 9/1999 | Coursey | |
| 6,016,427 A | 1/2000 | Barber et al. | |
| 6,148,197 A | 11/2000 | Bridges et al. | |
| 6,415,148 B1 | 7/2002 | Chiniga et al. | |
| 6,463,298 B1 | 10/2002 | Sorenson et al. | |
| 6,625,451 B1 | 9/2003 | La Medica, Jr. et al. | |
| 7,437,165 B2 | 10/2008 | Burgess et al. | |
| 7,848,758 B1 | 12/2010 | Sill et al. | |
| 8,045,981 B2 | 10/2011 | Umatt et al. | |
| 8,060,133 B1 | 11/2011 | Khanka et al. | |
| 8,081,973 B2 | 12/2011 | Bamburak et al. | |
| 8,270,988 B1 | 9/2012 | Sarkar et al. | |
| 8,320,949 B2 | 11/2012 | Matta | |
| 8,325,648 B1 | 12/2012 | Shah et al. | |
| 8,494,518 B1 | 7/2013 | Shah et al. | |
| 2004/0266445 A1 | 12/2004 | Burgess et al. | |
| 2007/0054667 A1* | 3/2007 | Lee et al. | 455/434 |
| 2007/0077952 A1 | 4/2007 | Sartori et al. | |
| 2007/0142046 A1 | 6/2007 | Welnick | |
| 2007/0165537 A1* | 7/2007 | Magnusson et al. | 370/254 |
| 2008/0205345 A1* | 8/2008 | Sachs et al. | 370/332 |
| 2009/0098871 A1 | 4/2009 | Gogic | |
| 2009/0131053 A1* | 5/2009 | Sachs et al. | 455/436 |
| 2009/0147772 A1* | 6/2009 | Rao et al. | 370/352 |
| 2010/0037284 A1* | 2/2010 | Sachs | 726/1 |
| 2011/0070880 A1 | 3/2011 | Song et al. | |
| 2012/0302275 A1* | 11/2012 | Junell et al. | 455/514 |
| 2012/0327878 A1* | 12/2012 | Pedersen et al. | 370/329 |
| 2013/0028149 A1* | 1/2013 | Chen et al. | 370/280 |
| 2013/0065589 A1* | 3/2013 | Lee et al. | 455/436 |
| 2013/0279375 A1* | 10/2013 | Newberg et al. | 370/260 |
| 2014/0241183 A1* | 8/2014 | Comeau | 370/252 |

FOREIGN PATENT DOCUMENTS

WO    WO 2013/084720    6/2013

* cited by examiner

*Primary Examiner* — Chirag Shah
*Assistant Examiner* — Joshua Smith (57) ABSTRACT

A method and system to help manage latency in setup of fallback communications, such as circuit switched fallback calls for instance, by taking into account the load on various fallback carriers. When a first network is serving a device and engages in a process to facilitate setup of a communication for the device to be served by a second, fallback network, the first network will work with the second network to determine which local carriers of the second network are least loaded, and the first network will then direct the WCD to scan those determined least-loaded carriers in particular. This process may thus help to avoid having the WCD spend time scanning local carriers of the second network that the second network is unlikely to assign in any event due to loading.

17 Claims, 5 Drawing Sheets

USE OF FALLBACK CARRIER LOAD TO MANAGE FALLBACK COMMUNICATION SETUP LATENCY

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which wireless communication devices (WCDs) (also known as user equipment devices (UEs)), such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

In general, a cellular wireless network may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of WCDs, initiation of communications, handoff between coverage areas, and functions related to air interface communication.

In accordance with the air interface protocol, each coverage area may operate on one or more carrier frequencies or "carriers." More particularly, the base station that radiates to define a given coverage area may support one or more frequency bands, such as the 800 MHz band (one or more frequency ranges around 800 MHz), the 1.9 GHz band (one or more frequency ranges around 1.9 GHz), and the 2.5 GHz band (one or more frequency ranges around 2.5 GHz), and may provide service on one or more carrier frequencies with each supported band. In a frequency division duplex (FDD) arrangement, different carrier frequencies are used for the downlink than the uplink. Whereas, in a time division duplex (TDD) arrangement, the same carrier frequency is used for the downlink and uplink and is allocated over time among downlink and uplink communications.

On each carrier frequency in a coverage area, the coverage area may also define a number of air interface channels for carrying information between the base station and the WCDs. These channels may be defined in various ways, such as through frequency division multiplexing, time division multiplexing, and/or code-division multiplexing, for instance. By way of example, each coverage area may define a pilot channel, reference channel or other resource on which the base station may broadcast a pilot signal, reference signal, or the like that WCDs may detect as an indication of coverage and may measure to evaluate coverage strength. As another example, each coverage area may define an uplink control channel or other resource on which WCDs may transmit control messages such as registration requests and access requests to the base station. And each coverage area may define a downlink control channel or other resource on which the base station may transmit control messages such as system information messages and page messages to WCDs. Each coverage area may then define one or more traffic channels or other resources for carrying communication traffic such as voice data and other data between the base station and WCDs.

When a WCD first powers on or enters into coverage of the network, the WCD may scan for and identify a strongest pilot or reference signal and may register with the network by transmitting a registration request or attach request to a base station providing that signal. This registration process may serve to notify the network of the WCD's presence in a particular coverage area and to facilitate network authentication of the WCD. Once registered, the WCD may then operate in an idle mode in which the WCD monitors a downlink control channel to receive overhead information and to check for any page messages. In the idle mode, the WCD may have no assigned traffic channel resources on which to engage in bearer communication.

When the network has a communication (such as a voice call or other traffic) to provide to a WCD that is registered with the network but is operating in the idle mode, the network may page the WCD in an effort to then facilitate assigning traffic channel resources to the WCD. In particular, the network may transmit on the downlink a page message addressed to the WCD. Assuming the WCD receives this page message, the WCD may then transmit to the network a page response message on the uplink. And upon receipt of the page response message, the network may then assign traffic channel resources to the WCD, for use to carry the communication, thus transitioning the WCD to a connected or active mode in which the WCD can engage in the communication.

Likewise, when an idle WCD seeks to initiate a communication (such as to place a voice call or engage in other bearer communication), the WCD may transmit on the uplink to the base station an origination or connection request, and the network may then assign traffic channel resources to the WCD for use to carry the communication, similarly transitioning the WCD to a connected or active mode in which the WCD can engage in the communication.

OVERVIEW

In systems that provide service under more than one air interface protocol, service providers may implement functionality that allows WCDs to operate by default on one air interface protocol and to dynamically switch over to operate on another air interface protocol when necessary to engage in certain communications. By way of example, in a system that supports both LTE service for mobile broadband and an older protocol such as CDMA or GSM for traditional voice calls, service providers may implement "circuit switched fallback" (CSFB) functionality, which allows WCDs to operate by default on LTE and to switch over to operate on CDMA or GSM to engage in voice calls.

Under CSFB, for instance, a hybrid CDMA/LTE WCD may be arranged by default to scan for and register with an LTE network and to operate with its CDMA radio powered off, but to then engage in control signaling with the CDMA network via the LTE network, i.e., over the LTE air interface. To facilitate this, when the WCD registers with the LTE network, LTE network infrastructure such as a mobility management entity (MME) may signal through an interworking server (IWS) with the CDMA network to register the WCD with the CDMA network as well.

In turn, when the CDMA network has a voice call to connect to the WCD, the CDMA network may signal through the IWS to the LTE network to cause the LTE network to transmit a CSFB page message to the WCD over the LTE air interface. After further CSFB signaling through the LTE network, the WCD may then power on its CDMA radio and tune to the CDMA network to engage in the call over the CDMA air interface.

In one implementation of this process, for instance, once the WCD receives the CSFB page message for the incoming CSFB call, the WCD may transmit a CSFB extended service request message to its serving LTE base station as a request to set up the incoming CSFB call. In turn, the LTE base station may then send to the WCD a list of CDMA carriers on which the local CDMA network provides service. And the WCD may use its CDMA radio to scan for coverage on each of the listed CDMA carriers and transmit to the LTE base station a report of the strongest CDMA pilot signals and corresponding signal strengths that the WCD detected. The LTE network may then pass those pilot signal measurements via the IWS to the CDMA network, and the CDMA network may use those measurements as a basis to determine a CDMA coverage area and traffic channel to assign to the WCD. The CDMA network may then transmit a handover direction message via the IWS to the LTE network, which the LTE network may transmit to the WCD, directing the WCD to transition to CDMA to communicate in the assigned CDMA coverage area and traffic channel. The WCD may then use its CDMA radio to tune to the assigned channel and to engage in the call via CDMA.

Likewise, when the WCD is served by the LTE network and has a voice call to place, the WCD may transmit over the LTE air interface to its serving LTE base station a CSFB extended service request message to request setup of an outgoing CSFB call, and the LTE base station may similarly send to the WCD a list of CDMA carriers on which the local CDMA network provides service. The WCD may then similarly tune to CDMA and scan for coverage on each of the listed CDMA carriers, and report the strongest detected CDMA pilots to the LTE base station. And the CDMA network may similarly determine a CDMA coverage area and traffic channel to assign to the WCD and transmit a handover direction message via the IWS to the LTE network for transmission to the WCD. The WCD may then similarly use its CDMA radio to tune to the assigned channel and to engage in the call via CDMA.

This CSFB call setup process is generally quite efficient, as it allows the WCD to engage in CDMA voice call setup through its existing LTE connection, without the need for the WCD to be idling in CDMA coverage in the first place.

Unfortunately, however, a problem with this process is that it can take a relatively long time for the WCD to scan the local CDMA carriers in search of suitable CDMA coverage to report to the LTE network. In practice, for instance, it may take on the order of 120 milliseconds for the WCD to scan each of the CDMA carriers indicated by the LTE base station. Thus, if the local CDMA network supports, say, one carrier on the 800 MHz band and three carriers on the 1.9 GHz band, it may take the WCD about 480 milliseconds in total to scan for CDMA coverage so as to then generate and transmit a measurement report to the LTE base station for transmission in turn via the IWS to the CDMA network.

Furthermore, the CDMA carriers that the WCD scans at the direction of the LTE base station may have varying levels of load. For instance, each carrier may have a different level of traffic channel utilization and/or control channel utilization.

If a particular carrier has threshold high load, such as greater than a threshold extent of channel capacity in use, the CDMA network may decline to assign a channel to the WCD on that carrier. Thus, having the WCD spend the time to scan such a channel may be unproductive and inefficient, giving rise to unnecessary delay in the CSFB call setup process.

Disclosed herein is a method and system to help manage latency in setup of fallback communications, such as CSFB calls for instance, by taking into account the load on various fallback carriers. In accordance with the disclosure, when a first network (e.g., LTE) is serving a WCD and engages in a process to facilitate setup of a communication for the WCD to be served by a second, fallback network (e.g., CDMA), the first network will work with the second network to determine which local carriers of the second network are least loaded, and the first network will then direct the WCD to scan those determined least-loaded carriers in particular. This process may thus help to avoid having the WCD spend time scanning local carriers of the second network that the second network is unlikely to assign in any event due to loading.

Accordingly, in one respect, disclosed is a method operable when a WCD is being served by a first base station of a first network. The method involves detecting a trigger to set up a fallback communication for the WCD to be served by a second network. Further, the method involves, responsive to detecting the trigger, (i) determining a second base station of the second network corresponding with the first base station of the first network, wherein the second base station provides service on a plurality of carriers, (ii) identifying, based on current loading on the plurality of carriers, one or more least-loaded carriers of the plurality, and (iii) transmitting from the first base station to the WCD a list of the identified one or more least-loaded carriers, as a directive for the WCD to scan the listed one or more carriers in search of coverage of the second network.

In another respect, disclosed is a method operable when a UE is being served by an eNodeB of an LTE network. In accordance with the method, the eNodeB may receive from the UE a CSFB extended service request message requesting setup of a CSFB call to be served by a fallback network to which the UE would transition to be served. Further, the eNodeB may forward the extended service request message to an MME of the LTE network, and the MME may transmit to an IWS information identifying the serving eNodeB. The IWS may then determine which of a plurality of a plurality of base stations of the fallback network corresponds with the identified serving eNodeB of the LTE network.

In the example method, the determined base station provides service on a plurality of carriers. Then IWS may then request from the fallback network an indication of which one or more carriers of that plurality are least loaded and may receive in response the requested indication. And the IWS may transmit to the MME the indication of which one or more carriers of the plurality are least loaded, and the MME may transmit to the eNodeB the indication of which one or more carriers of the plurality are least loaded. The eNodeB may then transmit to the UE a specification of the one or more indicated carriers as a directive for the UE to scan on the indicated carriers for coverage in which to engage in the CSFB call.

In practice, the act of transmitting the indication of the one or more carriers that are least loaded may take various forms. For example, it may involve transmitting a list of those least loaded carriers, excluding from the list any carriers that are not least loaded. As another example, it may involve transmitting a list of the most loaded carriers, which the MME or eNodeB may then remove from a default list of carriers, leaving as the specification just the least loaded carriers. As another example, it may involve transmitting a list of some or all carriers of the plurality with an indication for each carrier of level of load of the carrier, and the MME or eNodeB may determine based on the indicated load information which one or more of the carriers are least loaded, to thereby establish the specification for transmission to the UE. Other examples are possible as well.

In still another respect, disclosed is a communication system including a first network comprising a plurality of first base stations arranged to serve WCDs over a first air interface protocol, a second network comprising a plurality of second base stations arranged to serve WCDs over a second air interface protocol, and an IWS for passing signaling between the first network and the second network. In accordance with the disclosure, when a given WCD is being served by the first network and the first network receives from the WCD a request for the second network to set up a call for the WCD, the first network obtains from the IWS an indication of one or more carriers on which the second network is least loaded, and the first network directs the WCD to scan the indicated one or more carriers of the second network in search of coverage of the second network on which to engage in the call.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

As noted above, FIG. 1 is a simplified block diagram of a network arrangement in which an exemplary embodiment of the present method and system can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

Figure 1:
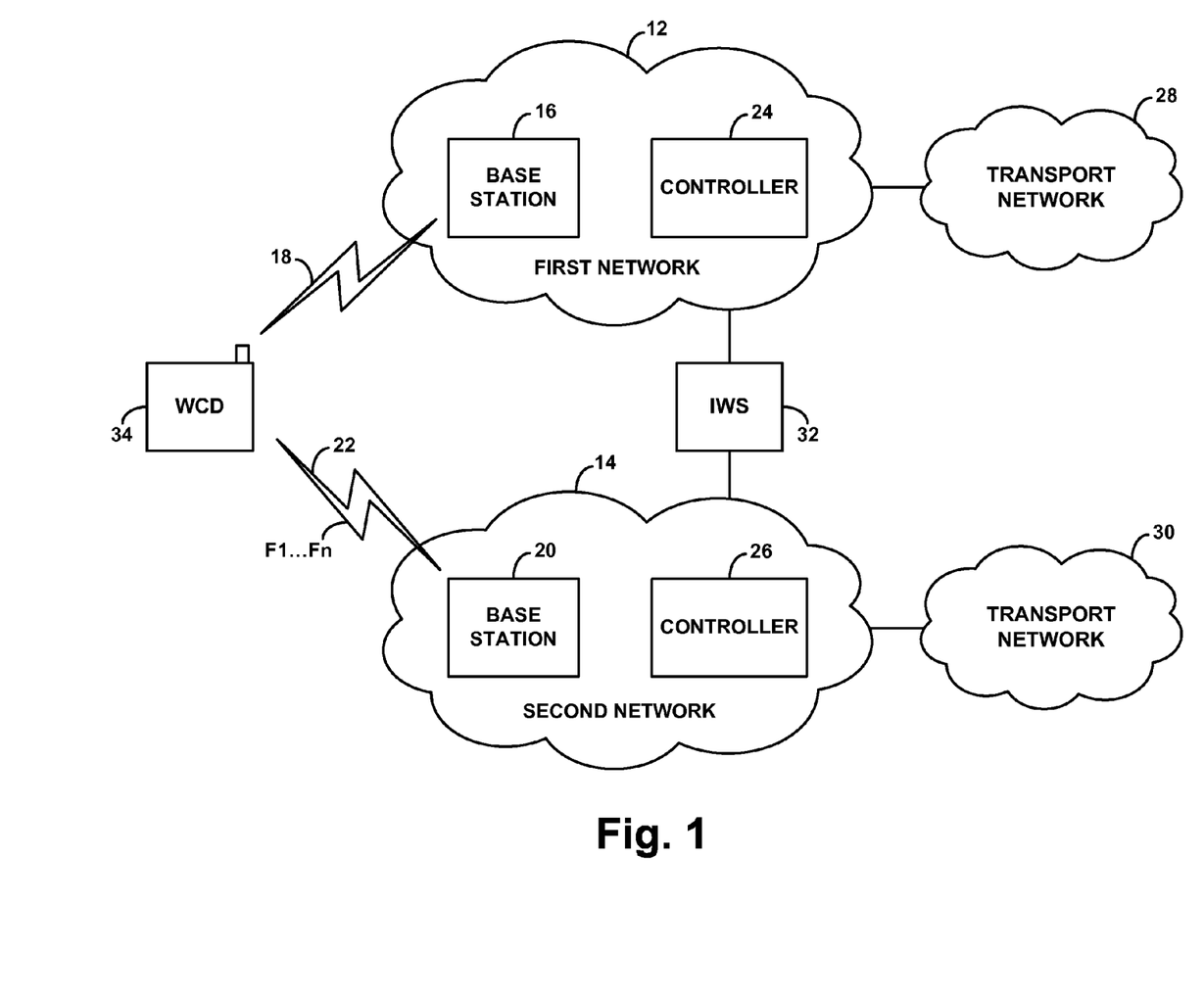
FIG. 1 is a simplified block diagram of a network arrangement in which an exemplary embodiment of the present method and apparatus can be implemented.

The arrangement of FIG. 1 includes by way of example two representative access networks 12, 14, each of which may function to provide WCDs with air interface coverage and connectivity with one or more transport networks such as the PSTN and the Internet. As such, each of these networks may include multiple base stations that radiate to provide one or more respective coverage areas defining an air interface in which to exchange control and bearer data with WCDs. For simplicity in the arrangement shown, for instance, network 12 includes a representative base station 16 that radiates to provide a coverage area 18, and network 14 includes a representative base station 20 that radiates to provide a coverage area 22. As discussed above, each such coverage area may operate on one or more carriers. By way of example, coverage area 22 provided by base station 20 of network 14 is shown operating on a plurality of carriers labeled F1 . . . Fn.

Each network may then further include various network infrastructure to support setup of connections and communications and/or to provide connectivity with transport networks. This network infrastructure may take various forms and include any of a variety of network elements, including for instance a controller of one form or another. For instance, in the arrangement shown, network 12 includes a respective controller 24, and network includes a respective controller 26. Network 12 is then shown providing connectivity with a representative transport network 28, and network 14 is shown providing connectivity with a representative transport network 30. In an example implementation, transport network 28 might be the Internet, and transport network 30 might be the PSTN.

As further shown in the figure, an IWS 32 is provided for passing signaling between the first network and the second network. In practice, the IWS may be provided as a function or element of one of the networks in particular. For instance, the IWS may be provided as a function of controller 26 in network 14. IWS may operate to pass signaling between the controllers 24 and/or other elements of the networks. For instance, in the context of the present disclosure, the IWS may function to pass CSFB call setup messages or similar setup messages between the networks.

Network 12 and network 14, and IWS 32 may be owned and operated by a common wireless service provider, and the service provider may configure the networks to interwork with each other (or may arrange for the IWS to associate the networks with each other) so as to facilitate CSFB for instance. Alternatively, the networks may be owned and/or operated by separate wireless service providers, and those service providers may have an agreement with each other to allow for interworking between the networks, again to facilitate CSFB or the like.

With the arrangement shown in FIG. 1, a WCD 34 is shown positioned in coverage of both network 12 and network 14. When such a WCD first powers on or arrives in coverage of network 12, the WCD may scan for and detect coverage provided by network 12 and may responsively register with network 12 by transmitting in coverage area 18 to base station 16 a registration request. In response, network 12 (e.g., controller 24) may then record the fact that WCD 34 is present within coverage area 18 served by base station 16, so as to facilitate paging WCD 34 for calls or other incoming communications. Further, given the association between network 12 and network 14, network 12 may also responsively signal to IWS 32 to trigger registration of WCD 34 with network 14. WCD 34 may then idle in coverage area 18 of network 12.

When network 14 has a call or other communication to connect or otherwise provide to WCD 34, network 14 may then send a page message (or page message trigger) to IWS 32, which IWS 32 may pass along to network 12 to trigger paging of the WCD via network 12. Network 12 may then responsively page the WCD by having base station 16 transmit a CSFB page message to the WCD in coverage area 18. In line with the example CSFB procedures described above, once the WCD responds to this CSFB page, the WCD may then send a CSFB extended service request message to base station 16 to request setup of the CSFB communication. And likewise, when the WCD seeks to place a CSFB call, the WCD may establish connectivity with base station 16 and may send a CSFB extended service request message to base station 16 to request setup of that CSFB communication.

In either case, base station 16 may then transmit to the WCD a list of carriers of the second network 14 for the WCD to scan in search of coverage in which to engage in the communication. In practice, for instance, given the example association between these networks, base station 16 may be provisioned to provide as the list of carriers those on which base stations of network 14 operate, such as carriers F1 . . . Fn for instance. The WCD may then scan those carriers of network 14 in search of coverage and may report one or more strongest detected pilots in a measurement report to base station 16 of network 12.

Network 12 may then forward to the IWS 32 a representation of the WCD's measurement report, which IWS 32 may in turn provide to an element of network 14, such as controller 26. With that information, network 14 may then select an appropriate coverage area and traffic channel on which to have the WCD engage in the communication, possibly taking into consideration load and perhaps avoiding assignment of a channel on a carrier that has threshold high load, or, given a choice, preferring assignment of a channel of a carrier with relatively low load. And the network 14 may return to IWS 32 a handover direction message directing the WCD take transition to that coverage area and channel to engage in the communication. IWS 32 may then pass that handover direction message to network 12, and base station 16 may transmit the message in coverage area 18 to the WCD. The WCD may then transition to be served by the indicated coverage area and channel of network 14 so as to engage in the communication.

In accordance with the present disclosure, to help avoid having the WCD spend time scanning for coverage on a carrier of network 14 that has relatively high load, network 12 may determine one or more carriers of network 14 on which network 14 is least loaded and may accordingly provide the WCD with a focused, filtered, reduced, or tailored list of those least-loaded carriers of network 14 as a directive for the WCD to scan those carriers. As such, based on the loading information of carriers on network 14, network 12 may avoid directing the WCD to scan one or more of the most-loaded carriers of network 14, by excluding one or more such most-loaded carriers from the list that base station 16 provides to the WCD.

To facilitate this in practice, after network 12 receives from the WCD a CSFB extended service request requesting setup of a CSFB communication but before network 12 provides the WCD with a list of carriers of network 14 to scan for coverage for that communication, network 12 may engage in signaling with or via IWS 32 to find out from network 14 which carriers of network 14 are least loaded (or, by the same token, which carriers of network 14 are most loaded and should be excluded from the scanning list).

Further, the IWS may be provisioned with or otherwise have access to a data table that correlates base stations of network 12 with base stations of network 14, such as based on geographic proximity, and that indicates the carriers on which each base station of network 14 operates. For instance, such a table may show that base station 16 of network 12 corresponds with (e.g., is nearby or provides overlapping coverage with) base station 20 of network 14 and that base station 20 of network 14 operates in the 1.9 GHz band on frequencies F1 and F2 and in the 800 MHz band on frequencies F3 and F4.

Further, the table may correlate other pairs of network 12 and network 14 base stations and indicate corresponding carriers of the network 14 base stations. Further, the table may define one to one correlations or one-to-many correlations for instance. In any event, such a table may thus allow the IWS to determine, given knowledge of the network 12 base station currently serving a WCD, which carriers of the network 14 are at issue.

In practice, once base station 16 receives a CSFB extended service request message from the WCD, base station 16 may pass that request message to controller 24. Controller 24 may then transmit a message to IWS 32, providing the IWS with an indication of base station 16 as the base station of network 12 that is currently serving the WCD at issue. And IWS 32 may then conveniently refer to the data table discussed above or to other reference data to identify a relevant set of carriers on which network 14 operates, optimally those on which one or more network 14 base stations near base station 16 operate.

Given an indication of the network 14 carriers at issue, IWS 32 may then query one or more elements of network 14 to obtain information indicating the least loaded carriers of that group of carriers. For instance, the IWS may query controller 26, base station 20, and/or another element of network 14 that may have access to such loading information, to request the information. Loading in this regard may have various meanings, such as the extent of traffic channel capacity in use, the extent of control channel capacity in use, and so forth.

The loading information that the IWS obtains through this querying may take various forms. For example, the information may comprise a measure of loading per carrier at issue, leaving it to the IWS or other network element to determine from that information which one or more carriers are least loaded. As another example, the information may comprise a list of just the least loaded carriers of those at issue, established by rank ordering the carriers in order of load and selecting from the rank ordered list a certain number, percentage, or other set of those least loaded in rank order. Or the information may comprise a list of just the most loaded carriers of those at issue (as a list of carriers to exclude from scanning), established through similar rank ordering and selection.

The IWS may the forward this information or a derivation of this information in a response message to controller 24, and controller 24 may forward the information or a derivation of the information along to base station 16 for transmission to the WCD. If the IWS had received a list of the least loaded carriers, for instance, that list may thus pass along to base station 16 and on to the WCD, as a directive for the WCD to scan those least loaded carriers and to provide a measurement report in response. On the other hand, if the IWS had received a specification of load per carrier, the IWS, controller 24, base station 16, or other entity may select from that specification the least loaded carriers to direct the WCD to scan. And if the IWS had received a list of the most loaded carriers, the IWS, controller 24, base station 16, or other entity may exclude from a default list of carriers of network 14 the indicated most-loaded carriers so as to produce a list of least loaded carriers to direct the WCD to scan.

Figure 2:
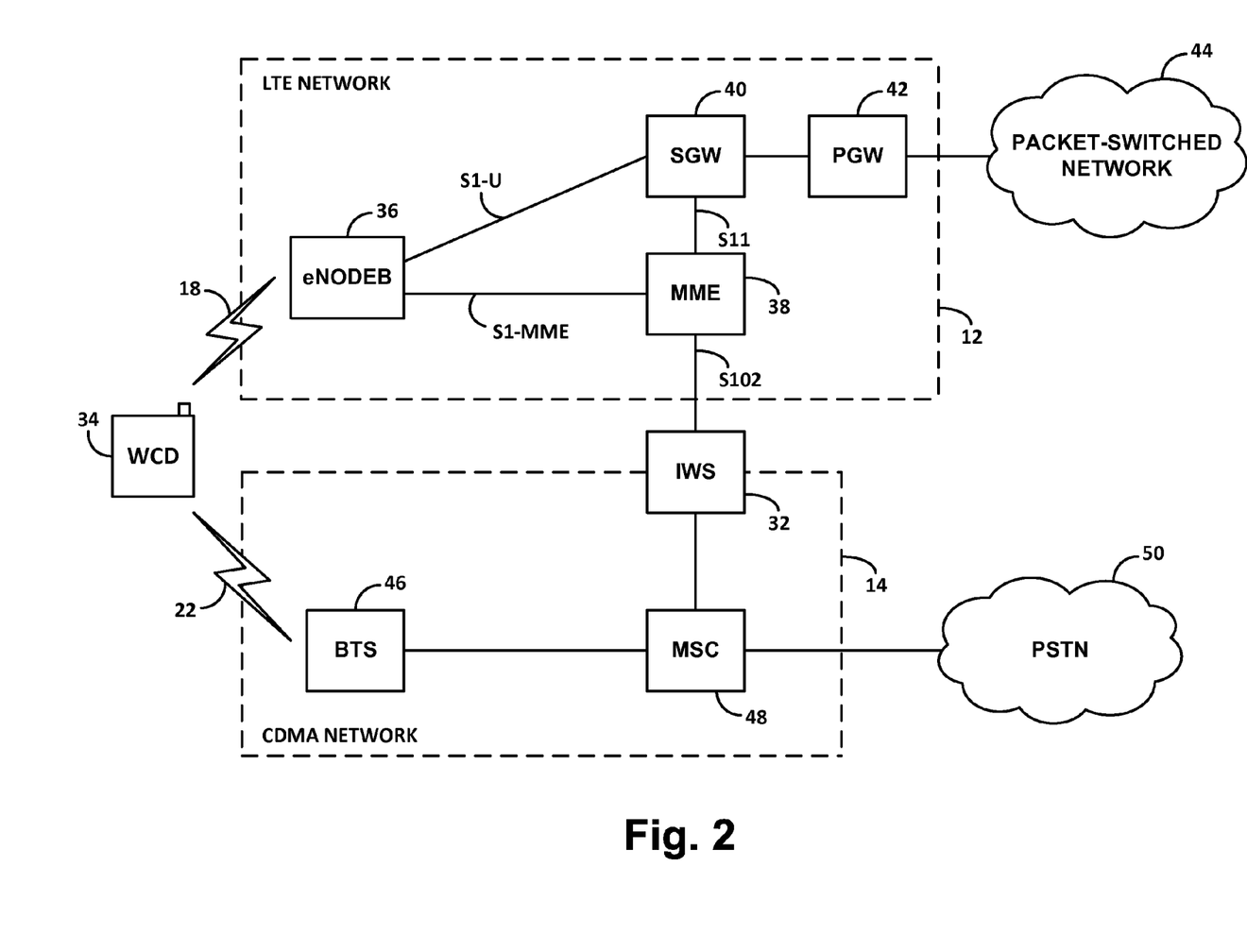
FIG. 2 is a simplified block diagram of a more specific network arrangement in which the exemplary embodiment can be implemented.

FIG. 2 is next a more specific block diagram depicting an example implementation of the network arrangement shown in FIG. 1. In the arrangement of FIG. 2, network 12 is an LTE network that primarily serves WCDs with wireless packet data communication service (including perhaps voice-over-packet and other packet-based real-time media service), and network 14 is a CDMA network that primarily serves WCDs with circuit-switched voice call service (but may also provide packet-data communication service and other types of service). These networks could take other forms as well, using other protocols such as WiMAX, GSM, or others now known or later developed.

The LTE network 12 in this arrangement is shown including a representative LTE base station 36 known as an eNodeB, which includes an antenna structure and associated equipment for engaging in LTE communication over the air interface of coverage area 18 with WCDs. The eNodeB 36 is then shown coupled with an MME 38 that serves as controller 24 and particularly as a signaling controller for the LTE network. Further, the eNodeB 36 is also shown coupled with a serving gateway (SGW) 40, which may then be coupled with a packet-gateway (PGW) 42 that connects with a packet-switched network 44. And the MME 38 is shown coupled with the SGW 40. Although the elements of the LTE network 12 are shown with direct connections between them, in a likely arrangement, the elements may sit as nodes on a core packet network, and thus the illustrated connections may be logical interfaces between the elements over that network.

The CDMA network 14, on the other hand, is shown including a representative CDMA base station 46 known as a base transceiver station (BTS), which includes an antenna structure and associated equipment for engaging in CDMA communication over the air interface of coverage area 22 with WCDs. The BTS 46 is then shown in communication (possibly through a base station controller (BSC) or radio network controller (RNC) (not shown)) with a mobile switching center (MSC) 48 that serves as controller 26 to manage paging over the CDMA air interface and that provides connectivity with the PSTN 50.

Further shown in FIG. 2 is then the IWS 32, which functions to facilitate interworking between the LTE network 12 and the CDMA network 14 as discussed above, so as to facilitate CSFB functionality for instance and to facilitate various specific features of the present disclosure.

In practice with this LTE/CDMA arrangement, the LTE eNodeB 36 may broadcast an overhead signal such as a System Information Block #8 (SIB8) that includes data that a recipient WCD may programmatically interpret to mean that the LTE coverage area in which the overhead signal is broadcast is one that supports CSFB functionality. The WCD may then detect this broadcast signal and responsively register in coverage area 18 with the LTE network. Under LTE principles, the WCD may do so by transmitting an attach request to the eNodeB 36, including in the attach request data that indicates capabilities of the WCD and particularly an indication that the WCD supports CSFB functionality.

Upon receipt of this attach request, the LTE network may register presence of the WCD in coverage area 18 of eNodeB 36. For instance, eNodeB 30 may signal to MME 38 to trigger this registration. Further, in response to the attach request indicting that the WCD supports CSFB functionality, MME 38 may also signal to IWS 32 to trigger registration of the WCD with the CDMA network 14. In particular upon receipt of the signal from MME 38, IWS 32 may signal to MSC 48, and the MSC (in cooperation with a home location register and/or other network infrastructure) may register the fact that the WCD is currently served by the LTE network 12.

When the MSC 48 receives a request to connect a call to the WCD, the MSC may then send to the IWS 32 a page request, and the IWS may in turn signal to the MME 38. The MME may then signal to the eNodeB to trigger paging of the WCD over the LTE air interface. The eNodeB may then transmit a CSFB page to the WCD, to which the WCD may respond, and the WCD may transmit to the eNodeB a CSFB extended service request message, which the eNodeB may forward to the MME. And likewise, if the WCD seeks to originate a CSFB call, the WCD may establish connectivity with the eNodeB if necessary and may then send a CSFB extended service request message to the eNodeB, which the eNodeB may similarly forward to the MME.

In accordance with the disclosure, the MME may then signal to the IWS, providing an indication of the serving eNodeB 36 for instance, and IWS may correlate that eNodeB with BTS 46 of the CDMA network and request MSC 48 to provide information indicating the least loaded carriers of the CDMA network and particularly of BTS 46. Upon receipt of that information, the IWS may then send the information in response to the MME, and the MME may forward the information to the eNodeB, with possible derivations as discussed above. The eNodeB may then advantageously transmit to the WCD a specification of one or more least loaded carriers of the CDMA network for the WCD to scan, and the CSFB setup process may then continue as discussed above.

Figure 3:
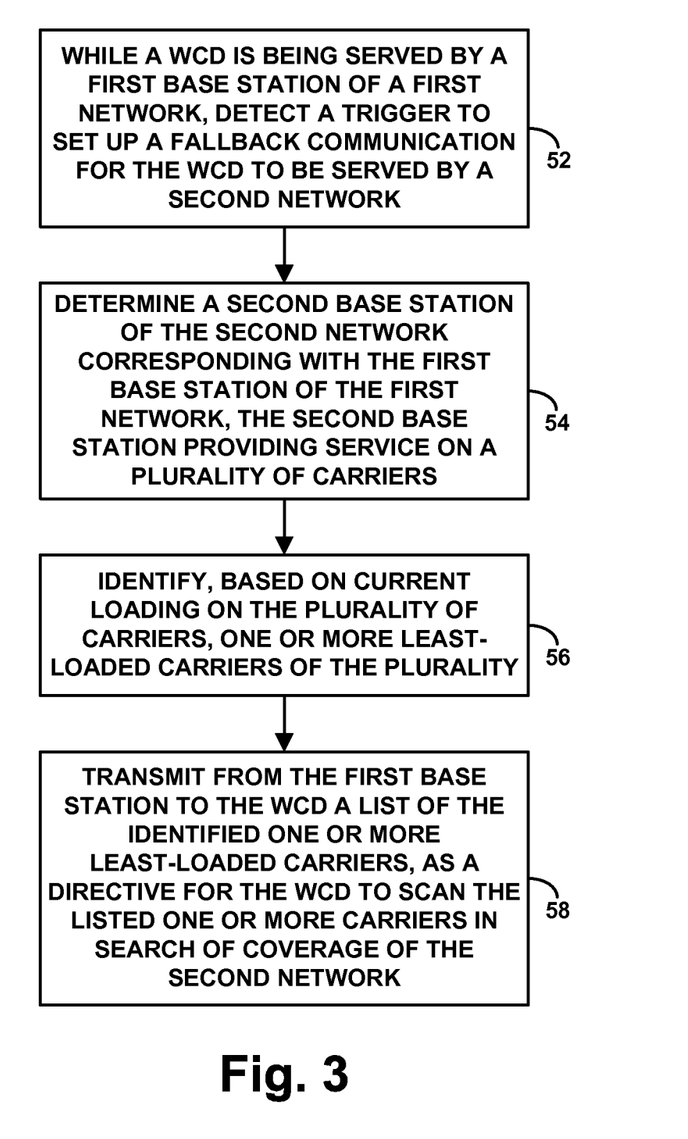
FIG. 3 is a flow chart depicting functions that can be carried out in accordance with an example method.

FIG. 3 is next a flow chart depicting a method that can be carried out in accordance with the present disclosure, in an arrangement such as that depicted in FIG. 1 or more specifically in FIG. 2 for instance, and that can thus be implemented by one or more of the illustrated network elements as discussed above. As shown in FIG. 3, at block 52, the method involves, while a WCD is being served by a first base station of a first network, detecting a trigger to set up a fallback communication for the WCD to be served by a second network. In turn, the method involves, responsive to detecting the trigger, (i) at block 54, determining a second base station of the second network corresponding with the first base station of the first network, wherein the second base station provides service on a plurality of carriers, (ii) at block 56, identifying, based on current loading on the plurality of carriers, one or more least-loaded carriers of the plurality (such as a proper subset of carriers of the plurality), and (iii) at block 58, transmitting from the first base station to the WCD a list of the identified one or more least-loaded carriers, as a directive for the WCD to scan the listed one or more carriers in search of coverage of the second network.

In this method, as discussed above, an IWS may pass signaling between the first and second networks, and the IWS or one or more other network elements may maintain a data table that maps various base stations of the first network with various base stations of the second network. With that arrangement, the act of determining the second base station of the second network corresponding with the first base station of the first network may involve the IWS determining, by reference to the data table, the second base station of the second network corresponding with the first base station of the first network.

Further, the act of identifying, based on current loading on the plurality of carriers, the one or more least-loaded carriers of the plurality may take various forms. For example, this function may involve the IWS requesting from an element of the second network a specification of the least-loaded carriers of the plurality and the IWS receiving in response the specification of the least-loaded carriers of the plurality. Further, the function may involve the IWS forwarding the received specification to an element of the first network to facilitate transmission of the list to the WCD.

As another example, the function of identifying, based on the current loading on the plurality of carriers, the one or more least-loaded carriers of the plurality may involve (i) the IWS requesting from an element of the second network a specification of load per carrier of the plurality of carriers and the IWS receiving in response the specification of load per carrier of the plurality of carriers, and (ii) a network element of the first network identifying based on the specification of load per carrier the one or more least-loaded carriers of the plurality.

In addition, the act of detecting the trigger to set up the fallback communication for the WCD to be served by the second network may also take various forms. For instance, this function may involve receiving, by a network element of first network, a fallback communication setup request message for the WCD. In particular, the first network may be an LTE network, the fallback communication may be a CSFB communication, and the fallback communication setup request message may be a CSFB extended service request message. Further, the second network may then be a CDMA network, a GSM network, or another sort of fallback network now known or later developed.

The method depicted in FIG. 3 may also include other functions. For example, the method may include, after transmitting the list to the WCD, receiving into the first base station from the WCD, a measurement report indicating coverage that the WCD has detected from scanning the listed one or more carriers. Further, the method may involve forwarding from the first network to the second network a representation of the measurement report. And the method may involve receiving from the second network into the first network a traffic channel assignment message assigning to the WCD a traffic channel in the second network selected based at least in part on the received measurement report, and transmitting the traffic channel assignment message from the first base station to the WCD. The WCD may then transition to be served by the second network and to engage in the fallback communication on the assigned traffic channel.

Figure 4:
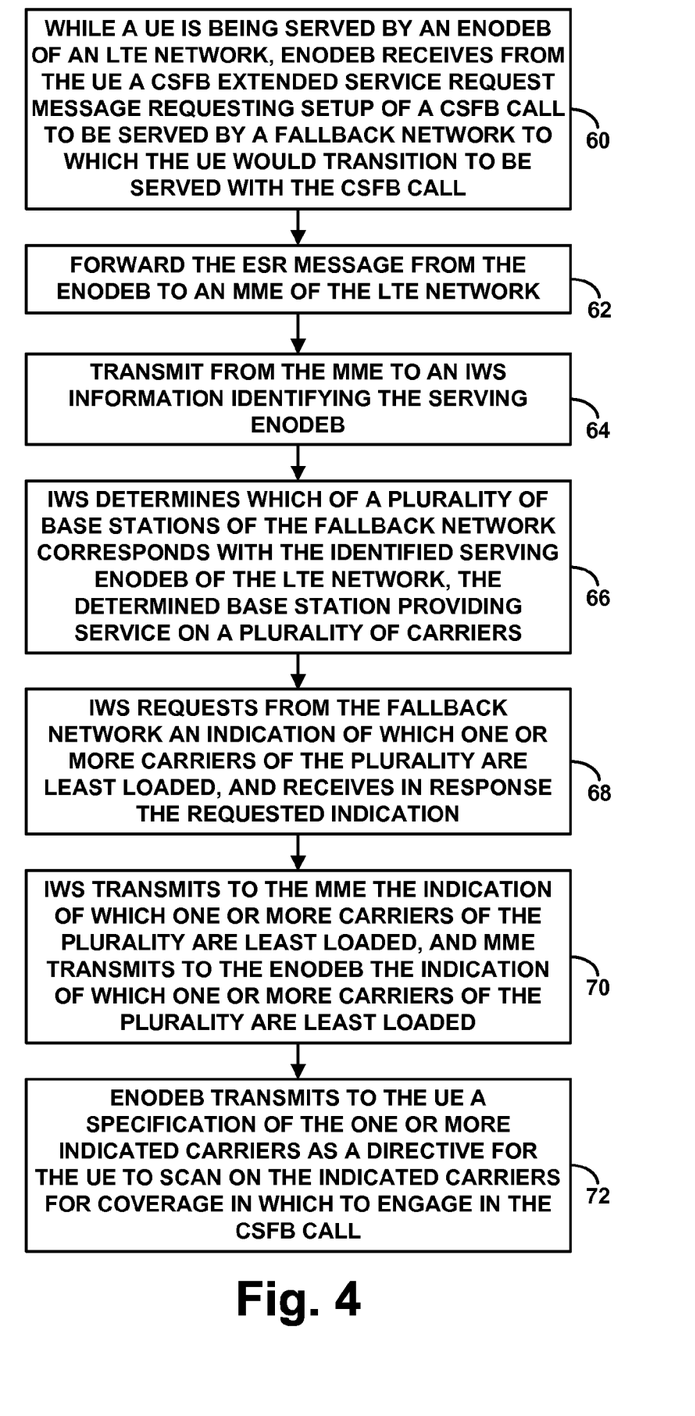
FIG. 4 is another flow chart depicting functions that can be carried out in accordance with an example method.

FIG. 4 is next another flow chart depicting a method that can be carried out with a network arrangement such as that shown in FIG. 2 for instance. As shown in FIG. 4, at block 60, the method involves, while a UE is being served by an eNodeB of an LTE network, the eNodeB receiving from the UE a CSFB extended service request (ESR) message requesting setup of a CSFB call to be served by a fallback network to which the UE would transition to be served with the CSFB call. At block 62, the method then involves forwarding the ESR message from the eNodeB to an MME of the LTE network. And at block 64, the method involves transmitting from the MME to an IWS information identifying the serving eNodeB.

At block 66, the method then involves the IWS determining which of a plurality of base stations of the fallback network corresponds with the identified serving eNodeB of the LTE network, where the determined base station provides service on a plurality of carriers. And at block 68, the method may involves the IWS requesting from the fallback network an indication of which one or more carriers of the plurality are least loaded, and the IWS receiving in response the requested indication.

At block 70, the method then involves the IWS transmitting to the MME the indication of which one or more carriers of the plurality are least loaded, and the MME transmitting to the eNodeB the indication of which one or more carriers of the plurality are least loaded. And at block 72, the method involves the eNodeB transmitting to the UE a specification of the one or more indicated carriers as a directive for the UE to scan on the indicated carriers for coverage in which to engage in the CSFB call.

Although not shown in FIG. 4, the method may then further involve the eNodeB receiving from the UE a measurement report indicating one or more pilots that the UE has detected from scanning the indicated one or more carriers, and the method may involve forwarding from the eNodeB to the MME to the IWS a representation of the indicated one or more pilots. Further, the method may involve the IWS receiving from the fallback network a handover direction message directing the UE to operate on a channel selected based at least in part on the indicated one or more pilots, and forwarding the handover direction message from the IWS to the MME to the eNodeB. And the method may involve the eNodeB transmitting the handover direction message to the UE as a direction for the UE to transition to be served by the fallback network and to engage in the CSFB call on the selected channel.

In line with the discussion above, to facilitate this process, the IWS may maintain a data table that maps various eNodeBs of the LTE network with the plurality of base stations of the fallback network, based on geographic proximity for instance. To determine which of the plurality of base stations of the fallback network corresponds with the identified serving eNodeB of the LTE network, the IWS may then refer to that data table.

Figure 5:
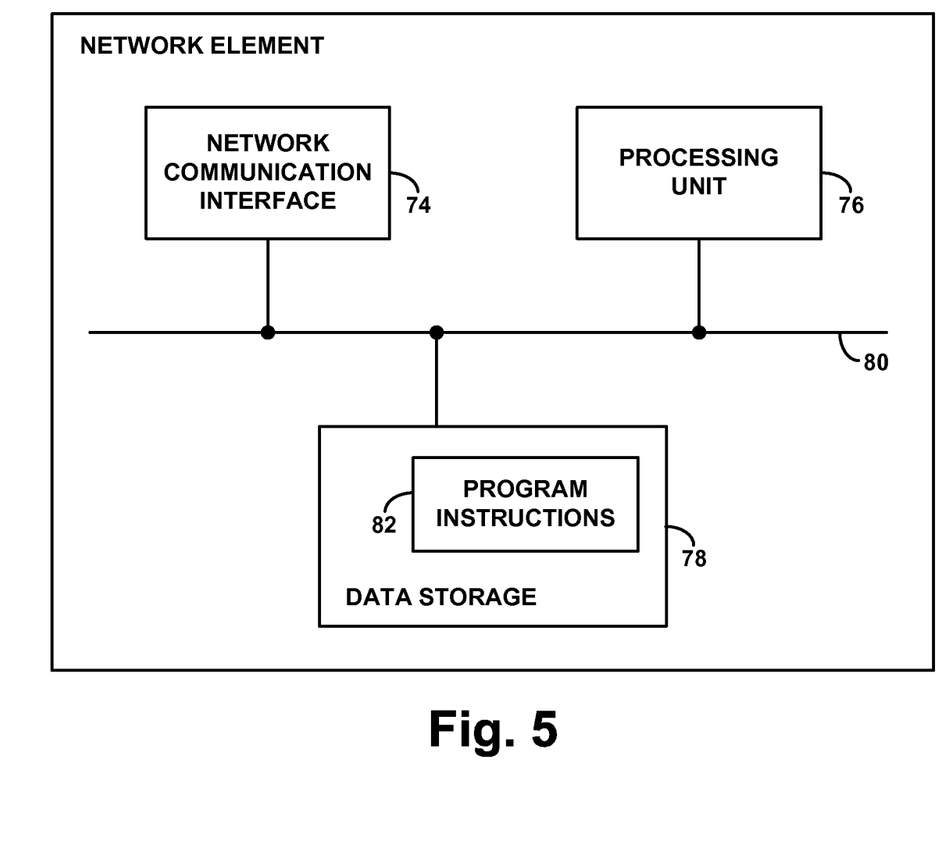
FIG. 5 is a simplified block diagram of a network element operable in a network arrangement such as that depicted in FIGS. 1 and 2.

FIG. 5 is next a simplified block diagram of a network element showing some of the physical components that such an element may include. This block diagram may represent any of a variety of the network elements shown in FIGS. 1 and 2 for instance.

As shown in FIG. 5, the network element includes a network communication interface 74, a processing unit 76, and data storage 78, all of which may be communicatively linked together by a system bus, network, or other connection mechanism 80. With this arrangement, the network communication interface may function to provide for communication with various other network elements and may thus take various forms, allowing for wired and/or wireless communication for instance. Processing unit may then comprise one or more general purpose processors (e.g., microprocessors) and/or one or more special purpose processors (e.g., application specific integrated circuits) and may be integrated in whole or in part with the network communication interface. And data storage 78 may comprise one or more volatile and/or non-volatile storage components, such as optical, magnetic, or flash memory and may be integrated in whole or in part with the processing unit. As shown, by way of example, data storage 78 may then comprise program instructions 82, which may be executable by processing unit 74 to carry out various functions described herein.

Exemplary embodiments have been described above. Those skilled in the art will understand, however, that changes and modifications may be made to these embodiments without departing from the true scope and spirit of the invention.

We claim:

1. A method comprising:
   while a wireless communication device (WCD) is being served by a first base station of a first network, detecting a trigger to set up a fallback communication for the WCD to be served by a second network; and
   responsive to detecting the trigger, (i) determining a second base station of the second network corresponding with the first base station of the first network, wherein the second base station provides service on a plurality of carriers, (ii) identifying, based on current loading on the plurality of carriers, one or more least-loaded carriers of the plurality, and (iii) transmitting from the first base station to the WCD a list of the identified one or more least-loaded carriers, as a directive for the WCD to scan the listed one or more carriers in search of coverage of the second network,
   wherein an interworking server (IWS) passes signaling between the first network and the second network, and wherein the first network transmits to the IWS an indication of which first base station of the first network is serving the WCD, wherein determining the second base station of the second network corresponding with the first base station of the first network comprises the IWS determining the second base station of the second network corresponding with the first base station of the first network, by reference to data that maps various base stations of the first network with base stations of the second network based on geographic proximity, and wherein identifying the one or more least-loaded carriers of the plurality involves the IWS.

2. The method of claim 1, further comprising:
maintaining a data table defining the data that maps various base stations of the first network with various base stations of the second network based on geographic proximity,
wherein the IWS determining the second base station of the second network corresponding with the first base station of the first network comprises the IWS determining, by reference to the data table, the second base station of the second network corresponding with the first base station of the first network.

3. The method of claim 2, wherein maintaining the data table comprises the IWS maintaining the data table.

4. The method of claim 2, wherein identifying, based on current loading on the plurality of carriers, the one or more least-loaded carriers of the plurality comprises the IWS requesting from an element of the second network a specification of the least-loaded carriers of the plurality and the IWS receiving in response the specification of the least-loaded carriers of the plurality.

5. The method of claim 4, wherein identifying, based on current loading on the plurality of carriers, the one or more least-loaded carriers of the plurality further comprises the IWS forwarding the received specification to an element of the first network to facilitate transmission of the list to the WCD.

6. The method of claim 2, wherein identifying, based on the current loading on the plurality of carriers, the one or more least-loaded carriers of the plurality comprises (i) the IWS requesting from an element of the second network a specification of load per carrier of the plurality of carriers and the IWS receiving in response the specification of load per carrier of the plurality of carriers, and (ii) a network element of the first network identifying based on the specification of load per carrier the one or more least-loaded carriers of the plurality.

7. The method of claim 1, wherein the one or more least-loaded carriers of the plurality is a proper subset of the plurality.

8. The method of claim 1, wherein detecting the trigger to set up the fallback communication for the WCD to be served by the second network comprises receiving, by a network element of first network, a fallback communication setup request message for the WCD.

9. The method of claim 8, wherein the first network is a Long Term Evolution (LTE) network, wherein the fallback communication is a circuit switched fallback (CSFB) communication, and wherein the fallback communication setup request message is a CSFB extended service request message.

10. The method of claim 9, wherein the second network is selected from the group consisting of a Code Division Multiple Access (CDMA) network and a Global System for Mobile Communications (GSM) network.

11. The method of claim 1, further comprising:
after transmitting the list to the WCD, receiving into the first base station from the WCD, a measurement report indicating coverage that the WCD has detected from scanning the listed one or more carriers;
forwarding from the first network to the second network a representation of the measurement report;
receiving from the second network into the first network a traffic channel assignment message assigning to the WCD a traffic channel in the second network selected based at least in part on the received measurement report; and
transmitting the traffic channel assignment message from the first base station to the WCD,
whereby the WCD then transitions to be served by the second network and to engage in the fallback communication on the assigned traffic channel.

12. A method comprising:
while a user equipment device (UE) is being served by a base station (eNodeB) of a Long Term Evolution (LTE) network, receiving by the eNodeB from the UE a circuit switched fallback (CSFB) extended service request (ESR) message requesting setup of a CSFB call to be served by a fallback network to which the UE would transition to be served with the CSFB call;
forwarding the ESR message from the eNodeB to a mobility management entity (MME) of the LTE network;
transmitting from the MME to an interworking server (IWS) information identifying the serving eNodeB;
determining by the IWS which of a plurality of base stations of the fallback network corresponds with the identified serving eNodeB of the LTE network, wherein the determined base station provides service on a plurality of carriers, wherein the IWS maintains a data table that maps various eNodeBs of the LTE network with the plurality of base stations of the fallback network, wherein the mapping of eNodeBs with base stations is based at least in part on geographic proximity, and wherein determining by the IWS which of the plurality of base stations of the fallback network corresponds with the identified serving eNodeB of the LTE network is done at least in part by reference to the data table;
requesting by the IWS from the fallback network an indication of which one or more carriers of the plurality are least loaded, and receiving by the IWS in response the requested indication;
transmitting by the IWS to the MME the indication of which one or more carriers of the plurality are least loaded, and transmitting by the MME to the eNodeB the indication of which one or more carriers of the plurality are least loaded; and
transmitting from the eNodeB to the UE a specification of the one or more indicated carriers as a directive for the UE to scan on the indicated carriers for coverage in which to engage in the CSFB call.

13. The method of claim 12, further comprising:
receiving by the eNodeB from the UE a measurement report indicating one or more pilots that the UE has detected from scanning the indicated one or more carriers;
forwarding from the eNodeB to the MME to the IWS a representation of the indicated one or more pilots;
receiving from the fallback network into the IWS a handover direction message directing the UE to operate on a channel selected based at least in part on the indicated one or more pilots, and forwarding the handover direction message from the IWS to the MME to the eNodeB; and
transmitting the handover direction message from the eNodeB to the UE as a direction for the UE to transition to be served by the fallback network and to engage in the CSFB call on the selected channel.

14. A communication system comprising:

a first network comprising a plurality of first base stations arranged to serve wireless communication devices (WCDs) over a first air interface protocol;

a second network comprising a plurality of second base stations arranged to serve WCDs over a second air interface protocol; and an interworking server (IWS) for passing signaling between the first network and the second network, wherein, when a given WCD is being served by the first network and the first network receives from the WCD a request for the second network to set up a call for the WCD, the first network obtains from the IWS an indication of one or more carriers on which the second network is least loaded, and the first network directs the WCD to scan the indicated one or more carriers of the second network in search of coverage of the second network on which to engage in the call, wherein the first network transmits to the IWS an indication of which first base station of the first network is serving the WCD, the IWS maps that serving first base station to a corresponding second base station of the second network by reference to data that maps the first base stations of the first network with the second base stations of the second network based on geographic proximity, wherein the corresponding second base station operates on a plurality of carriers, and wherein the indication of the one or more carriers on which the second network is least loaded is with respect to the corresponding second base station.

15. The communication system of claim 14, wherein the first network receives from the WCD a measurement report indicating pilots of one or more coverage areas of the second network that the WCD detected by scanning as directed, the first network forwards to the IWS an indication of the one or more detected pilots, the first network receives from the IWS a handover direction message directing the WCD to operate on a particular one of the one or more coverage areas, and the first network transmits the handover direction message to the WCD to cause the WCD to transition to be served by the second network in the particular coverage area and to engage in the call served by the second network.

16. The communication system of claim 15, wherein the IWS stores a data table that defines the data mapping the first base stations of the first network with the second base stations of the second network, and wherein the IWS maps the serving first base station to the corresponding second base station by referring to the data table.

17. The communication system of claim 14, wherein the first network is a Long Term Evolution (LTE) network, wherein the second network is selected from the group consisting of a Code Division Multiple Access (CDMA) network and a Global System for Mobile Communications (GSM) network, and wherein the call is a circuit switched fallback call.

* * * * *